(12) United States Patent
Saito et al.

(10) Patent No.: US 9,032,933 B2
(45) Date of Patent: May 19, 2015

(54) FUEL SUPPLY CONTROL DEVICE AND FUEL SUPPLY SYSTEM

(75) Inventors: Yoshio Saito, Shioya-gun (JP); Yohei Kuriyagawa, Shioya-gun (JP)

(73) Assignee: KEIHIN CORPORATION (JP)

( * ) Notice: Subject to any disclaimer, the term of this patent is extended or adjusted under 35 U.S.C. 154(b) by 420 days.

(21) Appl. No.: 13/636,240

(22) PCT Filed: Jan. 7, 2011

(86) PCT No.: PCT/JP2011/050158
§ 371 (c)(1),
(2), (4) Date: Sep. 20, 2012

(87) PCT Pub. No.: WO2011/118240
PCT Pub. Date: Sep. 29, 2011

(65) Prior Publication Data
US 2013/0014729 A1 Jan. 17, 2013

(30) Foreign Application Priority Data
Mar. 26, 2010 (JP) ................................ 2010-071745

(51) Int. Cl.
*F02M 37/00* (2006.01)
*F02D 19/06* (2006.01)
(Continued)

(52) U.S. Cl.
CPC ........ *F02D 19/0605* (2013.01); *F02D 41/0025* (2013.01); *F02D 41/401* (2013.01); *F02D 2200/0414* (2013.01); *F02D 2200/0602* (2013.01); *F02D 2200/0606* (2013.01); *F02D 2200/503* (2013.01); *Y02T 10/36* (2013.01); *Y02T 10/44* (2013.01);
(Continued)

(58) Field of Classification Search
USPC ................................. 123/458, 527, 529, 511
See application file for complete search history.

(56) References Cited

U.S. PATENT DOCUMENTS 7,654,250 B2 * 2/2010 Fujinuma et al. ............. 123/529
2010/0012101 A1 * 1/2010 Fujinuma et al. ............. 123/527

FOREIGN PATENT DOCUMENTS

JP 7-290980 A 11/1995
JP 9-88724 A 3/1997
(Continued)

OTHER PUBLICATIONS

International Search Report for International Application No. PCT/JP2011/050158, mailed Feb. 8, 2011, with English translation.
(Continued)

*Primary Examiner* — Hieu T Vo
(74) *Attorney, Agent, or Firm* — Cantor Colburn LLP

(57) ABSTRACT

Provided is a fuel supply control device that performs power supply control of a shut-off valve including a first valve body that is disposed at a fuel supply path ranging from a gaseous fuel tank to a regulator and is opened in advance during power supply, and a second valve body that is opened due to a decrease in a differential pressure between upstream and downstream after the first valve body is opened, and fuel injection control. The fuel supply control device includes a control unit that sets a delay time from an initiation time of power supply to the shut-off valve to an initiation time of fuel injection in correspondence with a first fuel pressure upstream of the shut-off valve and a second fuel pressure downstream of the regulator, and initiates fuel injection after the delay time has passed after the initiation of the power supply to the shut-off valve.

8 Claims, 12 Drawing Sheets

(51) Int. Cl.

| | |
|---|---|
| *F02D 41/00* | (2006.01) |
| *F02D 41/40* | (2006.01) |
| *F02M 21/02* | (2006.01) |
| *H01M 8/04* | (2006.01) |
| *F02D 41/06* | (2006.01) |
| *F02M 59/36* | (2006.01) |

(52) U.S. Cl.
CPC ...... *F02M 21/0239* (2013.01); *F02D 19/0647* (2013.01); *F02D 19/0692* (2013.01); *F02D 41/0027* (2013.01); *H01M 8/0432* (2013.01); *H01M 8/04432* (2013.01); *H01M 8/04753* (2013.01); *F02D 19/0613* (2013.01); *Y02E 60/50* (2013.01); *Y02T 10/32* (2013.01)

(56) References Cited

FOREIGN PATENT DOCUMENTS

| | | |
|---|---|---|
| JP | 2002-256980 A | 9/2002 |
| JP | 2005-38693 A | 2/2005 |
| JP | 2006-147346 A | 6/2006 |
| JP | 2006-156320 A | 6/2006 |
| JP | 2009-129593 A | 6/2009 |

OTHER PUBLICATIONS

Notice of Allowance for Japanese Patent Application No. 2010-071745, mailed Nov. 12, 2013, with English translation.

* cited by examiner

FUEL SUPPLY CONTROL DEVICE AND FUEL SUPPLY SYSTEM

CROSS REFERENCE TO RELATED APPLICATIONS

This is a U.S. national stage of application No. PCT/JP2011/050158, filed on 7 Jan. 2011. Priority under 35 U.S.C. §119(a) and 35 U.S.C. §365(b) is claimed from Japanese Application No. 2010-071745, filed 26 Mar. 2010, the disclosure of which are also incorporated herein by reference.

TECHNICAL FIELD

The present invention relates to a fuel supply control device and a fuel supply system.

BACKGROUND ART

In recent years, as a technology for improving fuel efficiency and the environmental protection performance of a vehicle, introduction of a bi-fuel engine system, which selectively switches between a liquid fuel, such as gasoline, and a gaseous fuel, such as compressed natural gas (CNG), and supplies the fuels to a single engine, has progressed. Generally, in this bi-fuel engine system, in the case of using the gaseous fuel, the highly pressurized gaseous fuel that is filled in a gas tank is decompressed to a desired pressure by a regulator, and is supplied to a fuel injection valve that is dedicated to the gaseous fuel.

An electromagnetic type shut-off valve is inserted in a fuel supply path ranging from the gas tank to the regulator, and initiation and stopping of the gaseous fuel supply may be switched between by controlling the open and shut states of the shut-off valve using a control device. For example, PTL 1 discloses a technology in which a pressure difference between positions before and after a shut-off valve is detected by using two pressure sensors, and a current value for opening the shut-off valve is controlled in correspondence with the detection result so as to appropriately control a supply timing of gaseous fuel to an engine.

CITATION LIST

Patent Literature

[PTL 1] Japanese Unexamined Patent Application Publication No. 2002-256980

SUMMARY OF INVENTION

Technical Problem

A kick pilot structure shown in FIG. 12 is known as a structure of the shut-off valve. In the shut-off valve having this kick pilot structure, while power is not supplied, a plunger 101 is pressed by a spring 102, and a pilot valve 103 that is integrally provided in the plunger 101 comes into contact with a pilot valve seat 105 that is provided in a main valve 104. That is, while power is not supplied, both of the pilot valve 103 and the main valve 104 enter a shut valve state, and thus flow of the gaseous fuel from an upstream (gas tank side) flow path 106 to a downstream (regulator side) flow path 107 is blocked (refer to FIG. 12(a)).

On the other hand, when a suction force stronger than a repulsive force of the spring 102 acts on the plunger 101 due to power supply to the shut-off valve, the pilot valve 103 becomes separated (that is opened) from the pilot valve seat 105 due to movement of the plunger 101 by the suction force, and gaseous fuel starts to flow from the upstream flow path 106 to the downstream flow path 107 (refer to FIG. 12(b)). At this point in time, since the differential pressure between the upstream flow path 106 and the downstream flow path 107 is still large, the main valve 104 is kept in a shut valve state (the movement of the plunger 101 is also stopped).

In addition, after the pilot valve 103 is opened, when the differential pressure between the upstream flow path 106 and the downstream flow path 107 becomes small, the plunger 101 again initiates the movement at the point in time when the suction force due to the power supply exceeds the repulsive force. Due to the movement of this plunger 101, the main valve 104 is opened, and the gaseous fuel starts to flow from the upstream flow path 106 to the downstream flow path 107 with the maximum flow rate (refer to FIG. 12(c)). In this manner, in the shut-off valve having the kick pilot structure, it takes time from the power supply to the shut-off valve to the opening of the main valve 104.

In the case of using the shut-off valve having such a kick pilot structure, there is a concern that fuel injection may be initiated before the main valve 104 is opened after the power supply to the shut-off valve, a differential pressure between upstream and downstream of the main valve 104 may not decrease, and thus the main valve 104 may be kept in a shut valve state. That is, fuel supply shortage may occur.

The present invention has been made in consideration of the above-described circumstances, and an object thereof is to provide a fuel supply system and a fuel supply control device, which are capable of avoiding occurrence of fuel supply shortage by appropriately controlling an initiation time of fuel injection after the power supply to the shut-off valve in the case of using the shut-off valve having a kick pilot structure.

Solution to Problem

To solve the above-described problems, according to an embodiment of the present invention, there is provided a fuel supply control device that performs power supply control of a shut-off valve including a first valve body that is disposed at a fuel supply path ranging from a gaseous fuel tank to a regulator and is opened in advance during power supply, and a second valve body that is opened due to a decrease in a differential pressure between upstream and downstream after the first valve body is opened, and fuel injection control. The fuel supply control device includes a control unit that sets a delay time from an initiation time of power supply to the shut-off valve to an initiation time of fuel injection in correspondence with a first fuel pressure upstream of the shut-off valve and a second fuel pressure downstream of the regulator, and initiates fuel injection after the delay time has passed after the initiation of the power supply to the shut-off valve.

In this fuel supply control device of the present invention, the control unit may set the delay time in correspondence with at least one of a battery voltage, a fuel temperature, and an intake air temperature, in addition to the first fuel pressure and the second fuel pressure.

According to another embodiment of the invention, there is provided a fuel supply control device that performs power supply control of a shut-off valve including a first valve body that is disposed at a fuel supply path ranging from a gaseous fuel tank to a regulator and is opened in advance during power supply, and a second valve body that is opened due to a decrease in a differential pressure between upstream and downstream after the first valve body is opened, and fuel injection control. The fuel supply control device includes a control unit that initiates fuel injection after passage of a delay time that is set in advance based on a specified pressure upstream of the regulator and a specified pressure downstream of the regulator, in a case where a fuel pressure downstream of the regulator is greater than or equal to a predetermined pressure after the initiation of the power supply to the shut-off valve.

In this fuel supply control device of the present invention, the delay time may be set in advance based on at least one of a battery voltage, a fuel temperature, and an intake air temperature, in addition to the specified pressure upstream of the regulator and the specified pressure downstream of the regulator.

To solve the above-described problems, according to still another embodiment of the invention, there is provided a fuel supply system that is provided with a shut-off valve including a first valve body that is disposed at a fuel supply path ranging from a gaseous fuel tank to a regulator and is opened in advance during power supply, and a second valve body that is opened due to a decrease in a differential pressure between upstream and downstream after the first valve body is opened. The fuel supply system includes: a first pressure sensor that detects a fuel pressure upstream of the shut-off valve as a first fuel pressure; a second pressure sensor that detects a fuel pressure downstream of the regulator as a second fuel pressure; and a fuel supply control device that sets a delay time from an initiation time of power supply to the shut-off valve to an initiation time of fuel injection in correspondence with the first fuel pressure and the second fuel pressure, and initiates fuel injection after the delay time has passed after the initiation of the power supply to the shut-off valve.

The time taken until the second valve body is opened after the initiation of the power supply to the shut-off valve varies depending on the first fuel pressure and the second fuel pressure. Specifically, when the variation tendency thereof is obtained in advance, an appropriate delay time may be set in correspondence with the first fuel pressure and the second fuel pressure that are actually detected. Therefore, the initiation time of the fuel injection after the power supply to the shut-off valve may be appropriately controlled by delaying the initiation time of the fuel injection by using the delay time set as described above, and thus occurrence of fuel supply shortage due to impossibility of valve opening of the second valve body may be avoided.

In addition, in the fuel supply system of the present invention, the fuel supply control device may set the delay time in correspondence with at least one of a battery voltage, a fuel temperature, and an intake air temperature, in addition to the first fuel pressure and the second fuel pressure.

In this case, the delay time may be set with high accuracy in correspondence with an operation situation of an engine, and thus the occurrence of the fuel supply shortage may be reliably avoided.

According to still another embodiment of the present invention, there is provided a fuel supply system that is provided with a shut-off valve including a first valve body that is disposed at a fuel supply path ranging from a gaseous fuel tank to a regulator and is opened in advance during power supply, and a second valve body that is opened due to a decrease in a differential pressure between the upstream and downstream after the first valve body is opened. The fuel supply system includes: a pressure sensor that detects a fuel pressure downstream of the regulator; and a fuel supply control device that initiates fuel injection after passage of a delay time that is set in advance based on a specified pressure upstream of the regulator and a specified pressure downstream of the regulator, in a case where the fuel pressure is equal to or higher than a predetermined pressure after the initiation of the power supply to the shut-off valve.

In a case where the specified pressure upstream of the regulator and the specified pressure downstream of the regulator are known in advance, when the actually detected fuel pressure downstream of the regulator is greater than or equal to a predetermined pressure, a valve-opening time of the second valve body is uniquely determined. Therefore, when the valve-opening time of the second valve body, which is uniquely determined, is set in advance as the delay time (at this time, the delay time may be set with a margin), the initiation time of the fuel injection after the power supply to the shut-off valve may be appropriately controlled by initiating the fuel injection after passage of the delay time set in advance after the initiation of the power supply to the shut-off valve under a condition in which the specified pressure upstream of the regulator and the specified pressure downstream of the regulator are constant, and thus occurrence of fuel supply shortage due to impossibility of valve opening of the second valve body may be avoided. In addition, in this case, it is sufficient for the number of pressure sensors to be one, and thus cost reduction is also possible.

In this fuel supply system of the present invention, the delay time may be set in advance based on at least one of a battery voltage, a fuel temperature, and an intake air temperature, in addition to the specified pressure upstream of the regulator and the specified pressure downstream of the regulator.

In this case, since the initiation time of the fuel injection may be controlled by using the delay time with a high accuracy in correspondence with the operation situation of the engine, occurrence of fuel supply shortage may be reliably avoided.

Advantageous Effects of Invention

According to the present invention, it is possible to provide a fuel supply system and a fuel supply control device, which are capable of avoiding occurrence of fuel supply shortage by appropriately controlling an initiation time of fuel injection after the power supply to the shut-off valve in the case of using the shut-off valve having a kick pilot structure.

DESCRIPTION OF EMBODIMENTS

Hereinafter, an embodiment of the present invention will be described with reference to the attached drawings. In addition, in the following description, as a fuel supply system relating to the present invention, a bi-fuel engine system that selectively switches between a liquid fuel such as gasoline and a gaseous fuel such as compressed natural gas (CNG) and supplies the fuel to a single engine will be described as an example. In addition, as a fuel supply control device relating to the present invention, an ECU (Electronic Control Unit), which is used in the bi-fuel engine system, will be described as an example.

First Embodiment

Figure 1:
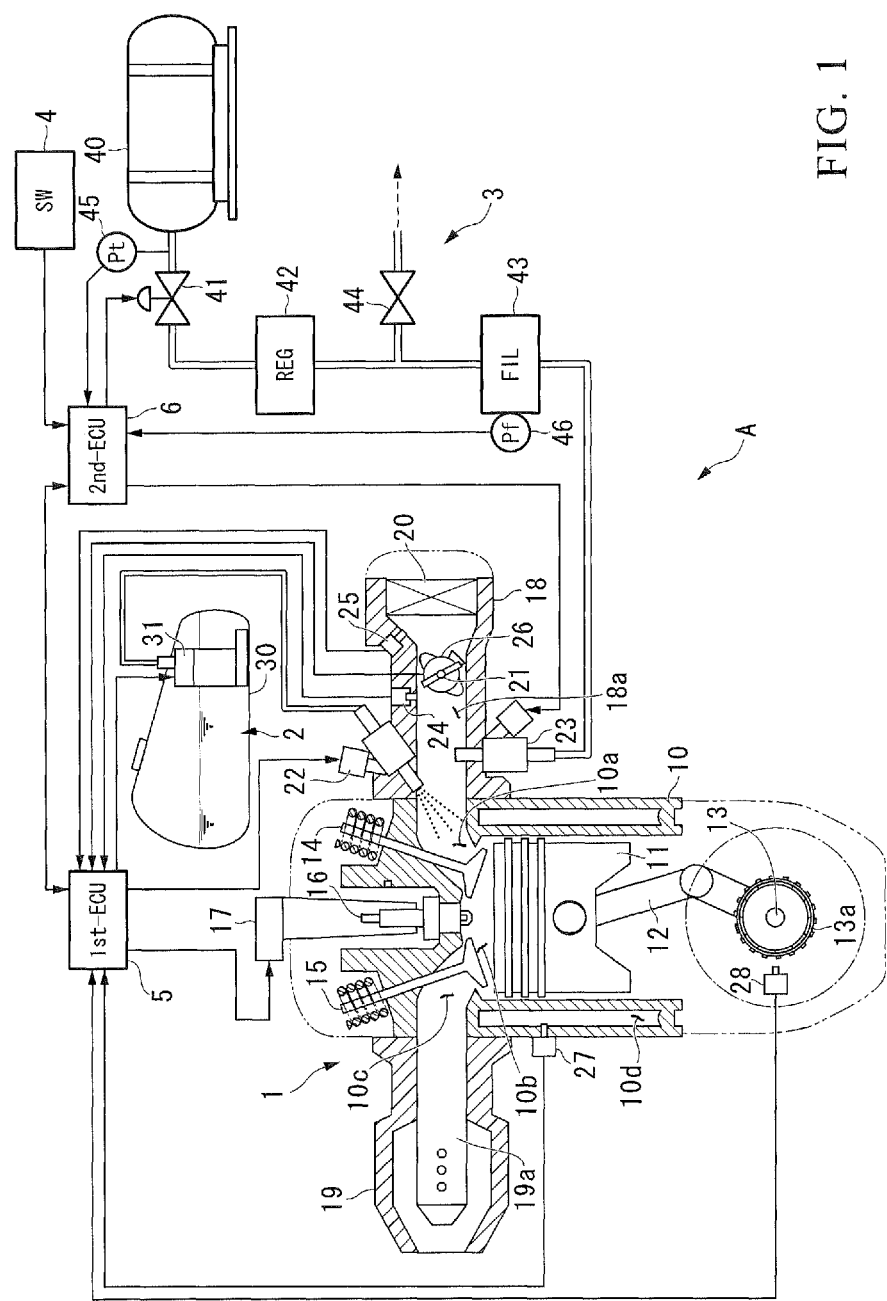
FIG. 1 is a schematic configuration diagram of a bi-fuel engine system A (a fuel supply system) according to a first embodiment.

FIG. 1 shows a schematic configuration diagram of a bi-fuel engine system A according to a first embodiment. As shown in FIG. 1, the bi-fuel engine system A in the first embodiment schematically includes an engine 1, a liquid fuel supply unit 2, a gaseous fuel supply unit 3, a fuel-switching switch 4, a $1^{st}$-ECU 5, and a $2^{nd}$-ECU 6 (a fuel supply control device).

The engine 1 is a four-cycle engine that may selectively use a liquid fuel and a gaseous fuel, and includes a cylinder 10, a piston 11, a connecting rod 12, a crankshaft 13, an intake valve 14, an exhaust valve 15, an ignition plug 16, an ignition coil 17, an intake pipe 18, an exhaust pipe 19, an air cleaner 20, a throttle valve 21, a liquid fuel injection valve 22, a gaseous fuel injection valve 23, an intake air pressure sensor 24, an intake air temperature sensor 25, a throttle opening degree sensor 26, a cooling water temperature sensor 27, and a crank angle sensor 28.

The cylinder 10 is a hollow cylindrical member that is used to make the piston 11, which is provided inside of the cylinder 10, undergo a reciprocating motion by repeating four strokes including intake, compression, combustion (i.e., expansion), and exhaust. The cylinder 10 includes an intake port 10a, a combustion chamber 10b, and an exhaust port 10c. The intake port 10a is a flow path that is used to supply mixed gas of air and fuel to the combustion chamber 10b. The combustion chamber 10b is a space that is used to store the above-described mixed gas and to cause the mixed gas that has been compressed in the compression stroke to be combusted in the combustion stroke. The exhaust port 10c is a flow path that is used to discharge exhaust gas from the combustion chamber 10b to the outside in the exhaust stroke. A cooling water path 10d that is used to circulate cooling water is provided in an outer wall of the cylinder 10.

The crankshaft 13, which is used to convert the reciprocating motion of the piston 11 into rotational motion, is connected to the piston 11 via the connecting rod 12.

The crankshaft 13 extends in a direction orthogonal to the reciprocation direction of the piston 11, and is connected to a flywheel (not shown), a mission gear, and the like. A rotor 13a, which is used to detect a crank angle, is co-axially connected to the crankshaft 13. A plurality of protrusions are provided at an outer circumference of the rotor 13a in such a manner that the rear ends of each of the protrusions are spaced with equal angular intervals (for example, at an interval of 20°) with respect to a rotational direction.

The intake valve 14 is a valve member that is used to open and shut an aperture portion of the air intake port 10a on the combustion chamber 10b side, and is connected to a camshaft (not shown). The intake valve 14 is driven to open and shut in response to the strokes by this camshaft.

The exhaust valve 15 is a valve member that is used to open and shut an aperture portion of the air exhaust port 10c on the combustion chamber 10b side, and is connected to a camshaft (not shown). The exhaust valve 15 is driven to open and shut in response to the respective strokes by this camshaft.

The ignition plug 16 is provided at an upper portion of the combustion chamber 10b in such a manner that electrodes are exposed to the inside of the combustion chamber 10b, and generates a spark between the electrodes by a high-voltage signal that is supplied from the ignition coil 17.

The ignition coil 17 is a transformer that is formed by a primary coil and a secondary coil. The ignition coil 17 boosts an ignition voltage signal that is supplied from the $1^{st}$-ECU 5 to the primary coil, and supplies the ignition voltage signal from the secondary coil to the ignition plug 16.

The intake pipe 18 is an air supply pipe and is connected to the cylinder 10 in such a manner that an intake flow path 18a provided inside the intake pipe 18 communicates with the intake port 10a.

The exhaust pipe 19 is a pipe that discharges exhaust gas and is connected to the cylinder 10 in such a manner that an exhaust flow path 19a inside the exhaust pipe communicates with the exhaust port 10c.

The air cleaner 20 is provided upstream of the intake pipe 18, purifies air taken in from the outside, and supplies the purified air to the intake flow path 18a.

The throttle valve 21 is provided inside the intake flow path 18a and rotates in response to throttle manipulation (or accelerator manipulation). That is, a cross-sectional area of the intake flow path 18a varies by the rotational motion of the throttle valve 21, and the air intake quantity accordingly varies.

The liquid fuel injection valve 22 is an electromagnetic valve (for example, a solenoid valve or the like) that is provided in the intake pipe 18 in such a manner that an injection port is exposed to the intake port 10a. The liquid fuel injection valve 22 injects the liquid fuel (gasoline or the like), which is supplied from the liquid fuel supply unit 2, from the injection port in response to a fuel injection valve driving signal supplied from the $1^{st}$-ECU 5.

The gaseous fuel injection valve 23 is an electromagnetic valve (for example, a solenoid valve or the like) that is provided in the intake pipe 18 in such a manner that an injection port is exposed to the intake port 10a. The gaseous fuel injection valve 23 injects the gaseous fuel (CNG or the like), which is supplied from the gaseous fuel supply unit 3, from the injection port in response to a fuel injection valve driving signal supplied from the $2^{nd}$-ECU 6.

The intake air pressure sensor 24 is a semiconductor pressure sensor that uses, for example, a piezoresistive effect. The intake air pressure sensor 24 is provided in the intake pipe 18 in such a manner that a sensitive surface thereof is exposed to the intake flow path 18a downstream of the throttle valve 21, and outputs an intake air pressure signal corresponding to the intake air pressure inside the intake pipe 18 to the 1$^{st}$-ECU 5.

The intake air temperature sensor 25 is provided in the intake pipe 18 in such a manner that a sensitive portion thereof is exposed to the intake flow path 18a upstream of the throttle valve 21, and outputs the intake air temperature signal corresponding to the intake air temperature inside the intake pipe 18 to the 1$^{st}$-ECU 5.

The throttle opening degree sensor 26 outputs a throttle opening degree signal corresponding to the opening degree of the throttle valve 21 to the 1$^{st}$-ECU 5.

The cooling water temperature sensor 27 is provided in the cylinder 10 in such a manner that a sensitive portion of the cooling water temperature sensor 27 is exposed to the cooling water path 10d of the cylinder 10, and outputs a cooling water temperature signal corresponding to the temperature of the cooling water that flows through the cooling water path 10d to the 1$^{st}$-ECU 5.

For example, the crank angle sensor 28 is an electromagnetic type pickup sensor. The crank angle sensor 28 outputs a pair of pulse signals having polarities different from each other to the 1$^{st}$-ECU 5 whenever each of the protrusions provided at the outer circumference of the rotor 13a passes the vicinity of the sensor 28. More specifically, the crank angle sensor 28 outputs a pulse signal having a negative polarity amplitude when the front end of each of the protrusions goes past in the rotation direction, and outputs a pulse signal having a positive polarity amplitude when the rear end of each of the protrusions goes past in the rotation direction.

The liquid fuel supply unit 2 includes a liquid fuel tank 30 and a fuel pump 31.

The liquid fuel tank 30 is a vessel in which liquid fuel such as gasoline fuel or alcohol fuel is stored.

The fuel pump 31 pumps the liquid fuel out of the liquid fuel tank 30 and pumps out the liquid fuel to a fuel inlet of the liquid fuel injection valve 22 in response to a pump driving signal supplied from the 1$^{st}$-ECU 5.

The gaseous fuel supply unit 3 includes a gaseous fuel tank 40, a shut-off valve 41, a regulator 42, a filter 43, a relief valve 44, a first pressure sensor 45, and a second pressure sensor 46.

For example, the gaseous fuel tank 40 is a pressure resistant vessel in which highly pressurized gaseous fuel such as CNG is filled.

The shut-off valve 41 is a shut-off valve that has a kick pilot structure and that is interposed in a fuel supply path ranging from the gaseous fuel tank 40 to the regulator 42. The shut-off valve 41 switches between initiation and stopping of gaseous fuel supply from the gaseous fuel tank 40 by performing a valve opening operation and a valve shutting operation in response to a shut-off valve driving signal that is supplied from the 2$^{nd}$-ECU 6. In addition, as described with reference to FIG. 12, the shut-off valve 41 having this kick pilot structure includes a pilot valve 103 (first valve body) that is opened in advance during power supply and a main valve 104 (second valve body) that is opened due to a decrease in the differential pressure between upstream and downstream after the pilot valve 103 is opened.

The regulator 42 is a pressure regulating valve that is disposed downstream of the shut-off valve 41. The regulator 42 decompresses the high-pressure gaseous fuel that is supplied from the gaseous fuel tank 40 at the time of opening the shut-off valve 41 to a desired pressure, and then delivers the decompressed gaseous fuel to the filter 43 that is provided at a downstream side.

The filter 43 removes foreign materials (for example, foreign materials such as compressor oil in the gaseous fuel) contained in the gaseous fuel delivered from the regulator 42, and delivers the gaseous fuel from which the foreign materials are removed to a fuel inlet of the gaseous fuel injection valve 23.

The relief valve 44 is a safety valve that is interposed in a divergence pipe that communicates with a pipe connecting the regulator 42 and the filter 43. In a case where the fuel pressure downstream of the regulator 42 exceeds a pressure that is set, the relief valve 44 is opened to discharge (relieve) the gaseous fuel to the outside.

The first pressure sensor 45 is a pressure sensor that is disposed at a fuel supply path ranging from the gaseous fuel tank 40 to the shut-off valve 41. The first pressure sensor 45 detects a fuel pressure upstream of the shut-off valve 41 as a tank supply pressure (a first fuel pressure) and outputs a tank supply pressure signal representing the detection result to the 2$^{nd}$-ECU 6.

The second pressure sensor 46 is a pressure sensor that is disposed in the filter 43. The second pressure sensor 46 detects a fuel pressure downstream of the regulator 42 as a regulator downstream pressure (a second fuel pressure) and outputs a regulator downstream pressure signal representing the detection result to the 2$^{nd}$-ECU 6.

The fuel-switching switch 4 is a switch to realize fuel-switching by a manual operation. The fuel-switching switch 4 outputs a fuel designation signal representing a state of the switch, that is, whether either the liquid fuel or the gaseous fuel is designated as a fuel that is used in the engine 1 to the 2$^{nd}$-ECU 6.

Figure 2:
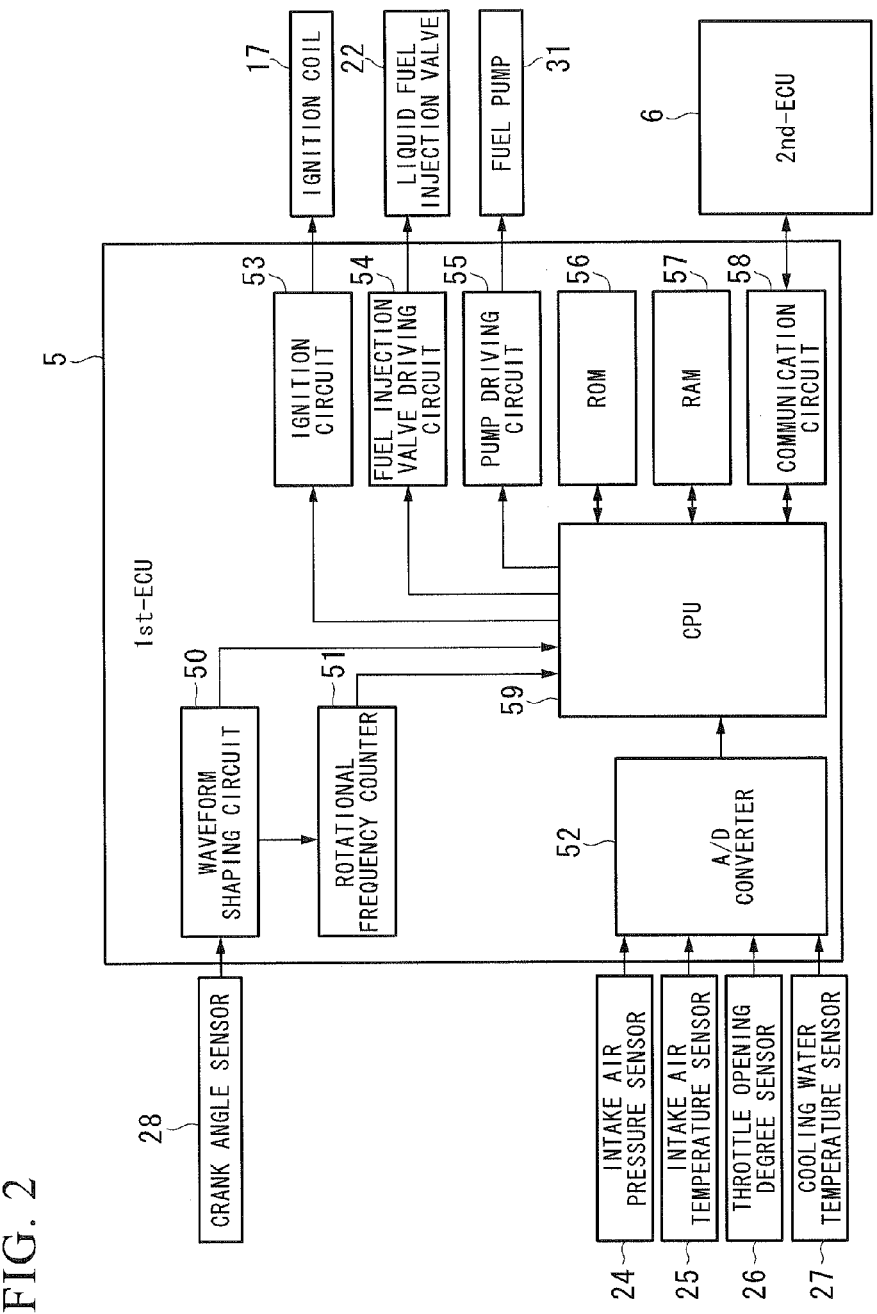
FIG. 2 is a block configuration diagram of a $1^{st}$-ECU 5 according to the first embodiment.

The 1$^{st}$-ECU 5 mainly performs operation control of the engine 1 that uses the liquid fuel. As shown in FIG. 2, the 1$^{st}$-ECU 5 includes a waveform shaping circuit 50, a rotational frequency counter 51, an A/D converter 52, an ignition circuit 53, a fuel injection valve driving circuit 54, a pump driving circuit 55, a ROM (Read Only Memory) 56, a RAM (Random Access Memory) 57, a communication circuit 58, and a CPU (Central Processing Unit) 59.

The waveform shaping circuit 50 performs waveform shaping to change a crank signal that is input from the crank angle sensor 28 into a square-wave pulse signal (for example, to change a negative polarity crank signal into a high level signal, and change a positive polarity crank signal in a ground level into a low level signal), and outputs the waveform-shaped signal to the rotational frequency counter 51 and the CPU 59. That is, this square-wave pulse signal is a square-wave pulse signal whose cycle is the length of time that is taken for the crankshaft 13 to rotate 20°. In the following description, the square-wave pulse signal that is output from the waveform shaping circuit 50 is referred to as a crank pulse signal.

The rotational frequency counter 51 calculates the engine rotational frequency based on the crank pulse signal that is input from the above-described waveform shaping circuit 50, and outputs the calculation result to the CPU 59.

The A/D converter 52 converts an intake air pressure signal that is input from the intake air pressure sensor 24, an intake air temperature signal that is input from the intake air temperature sensor 25, a throttle opening degree signal that is input from the throttle opening degree sensor 26, and a cooling water temperature signal that is input from the cooling water temperature sensor 27 into a digital signal (a value of the intake air pressure, a value of the intake air temperature, a value of the throttle opening degree, and a value of the cooling water temperature), and then outputs this digital signal to the CPU 59.

The ignition circuit 53 includes a capacitor that accumulates power supply voltage that is supplied from a battery (not shown) and discharges electric charges that have been accumulated in the capacitor to a primary coil of the ignition coil 17 as an ignition voltage signal in accordance with the request from the CPU 59.

The fuel injection valve driving circuit 54 generates a fuel injection valve driving signal in accordance with the request from the CPU 59 and outputs this fuel injection valve driving signal to the liquid fuel injection valve 22.

The pump driving circuit 55 generates a pump driving signal in accordance with the request from the CPU 59, and outputs the pump driving signal to the fuel pump 31.

The ROM 56 is a non-volatile memory in which an engine control program to realize various functions of the CPU 59 and various types of setting data are stored in advance.

The RAM 57 is a volatile working memory that is used to temporarily hold data when the CPU 59 causes the engine control program to execute various operations.

The communication circuit 58 is a communication interface that realizes a data communication between the $1^{st}$-ECU 5 and the $2^{nd}$-ECU 6 under the control of the CPU 59, and is connected to the $2^{nd}$-ECU 6 via a communication cable.

The CPU 59 performs operation control of the engine 1 by the liquid fuel in accordance with the engine control program that is stored in the ROM 56 based on the crank pulse signal that is input from the waveform shaping circuit 50, the engine rotational frequency that may be obtained from the rotational frequency counter 51, a value of the intake air pressure, a value of the intake air temperature, a value of the throttle opening degree, and a value of the cooling water temperature, which may be obtained from the A/D converter 52, and various kinds of information that may be obtained from the $2^{nd}$-ECU 6 via the communication circuit 58.

Specifically, the CPU 59 monitors a rotational state of the crankshaft 13 (in other words, a position of the piston 11 in the cylinder 10) based on the crank pulse signal that is input from the waveform shaping circuit 50, and outputs an ignition control signal to the ignition circuit 53 at the point in time at which the piston 11 reaches a position corresponding to an ignition time to cause the ignition plug 16 to spark.

When receiving an instruction of operation by using the liquid fuel from the $2^{nd}$-ECU 6 via the communication circuit 58, the CPU 59 outputs a fuel supply control signal to the pump driving circuit 55 so as to drive the fuel pump 31, and initiates supply of the liquid fuel to the liquid fuel injection valve 22. In addition, the CPU 59 outputs the fuel injection control signal to the fuel injection valve driving circuit 54 at the point in time at which the piston 11 reaches a position corresponding to a fuel injection time so as to perform injection of the liquid fuel by the liquid fuel injection valve 22. In addition, the CPU 59 also has a function of transmitting the position of the piston 11, the engine rotational frequency, the value of the intake air pressure, the value of the intake air temperature, the value of the throttle valve opening degree, and the value of the cooling water temperature, which are recognized by the CPU 59, to the $2^{nd}$-ECU 6 via the communication circuit 58.

Figure 3:
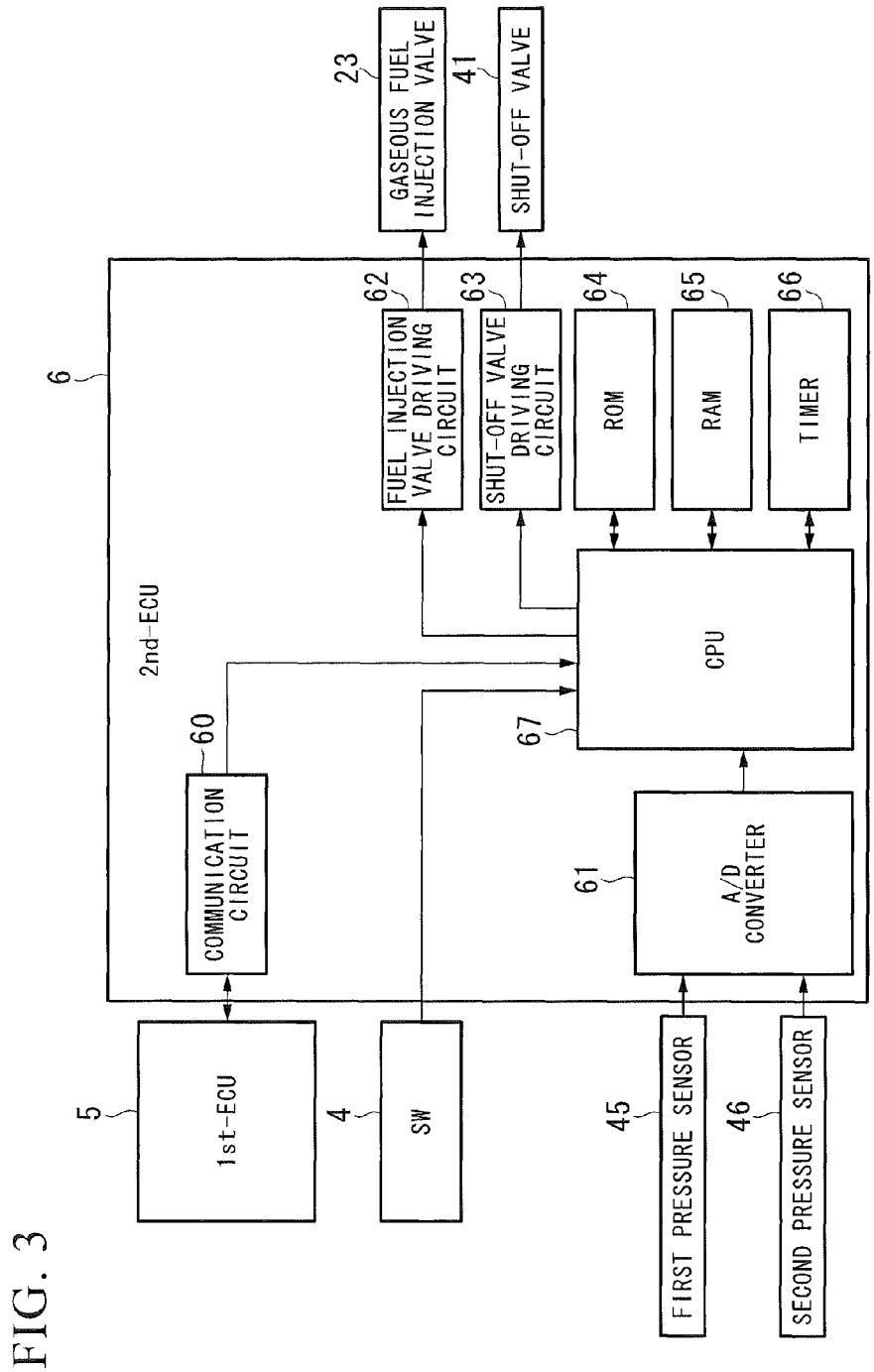
FIG. 3 is a block configuration diagram of a $2^{nd}$-ECU 6 (a fuel supply control device) according to the first embodiment.

The $2^{nd}$-ECU 6 performs operation control of the engine 1 that mainly uses the gaseous fuel. As shown in FIG. 3, the $2^{nd}$-ECU 6 includes a communication circuit 60, an A/D converter 61, a fuel injection valve driving circuit 62, a shut-off valve driving circuit 63, a ROM 64, a RAM 65, a timer 66, and a CPU 67.

The communication circuit 60 is a communication interface that realizes a data communication between the $1^{st}$-ECU 5 and the $2^{nd}$-ECU 6 under the control of the CPU 67, and is connected to the $1^{st}$-ECU 5 (more specifically, the communication circuit 58) via a communication cable.

The A/D converter 61 converts a tank supply pressure signal that is input from the first pressure sensor 45 and a regulator downstream pressure signal that is input from the second pressure sensor 46 into digital signals (a tank supply pressure Pt and a regulator downstream pressure Pf) and outputs these converted signals to the CPU 67.

The fuel injection valve driving circuit 62 generates a fuel injection valve driving signal in accordance with the request from the CPU 67 and outputs this fuel injection valve driving signal to the gaseous fuel injection valve 23.

The shut-off valve driving circuit 63 generates a shut-off valve driving signal in accordance with the request from the CPU 67 and outputs this shut-off valve driving signal to the shut-off valve 41.

The ROM 64 is a non-volatile memory in which an engine control program to realize various functions of the CPU 67 and various types of setting data are stored in advance.

The RAM 65 is a volatile working memory that is used to temporarily hold data when the CPU 67 causes the engine control program to execute various operations.

The timer 66 performs time counting in accordance with a request from the CPU 67 and informs the CPU 67 of the time counting result.

The CPU 67 (control unit) performs operation control of the engine 1 by the gaseous fuel in accordance with the engine control program that is stored in the ROM 64 based on the fuel designation signal that is input from the fuel-switching switch 4, the position of the piston 11, the engine rotational frequency, the value of the intake air pressure, the value of the intake air temperature, the value of the throttle opening degree, and the value of the cooling water temperature, which may be obtained from the $1^{st}$-ECU 5 via the communication circuit 60, and the tank supply pressure Pt and the regulator downstream pressure Pf that may be obtained from the A/D converter 61.

Specifically, in a case where it is determined that the liquid fuel is designated as the fuel that is used in the engine 1 from an analysis result of the fuel designation signal that is input from the fuel-switching switch 4, the CPU 67 transmits an instruction of operation by using the liquid fuel to the $1^{st}$-ECU 5 (more specifically, the communication circuit 58) via the communication circuit 60.

The CPU 67 has a function of setting a delay time Td from an initiation time of the power supply to the shut-off valve 41 to an initiation time of the fuel injection in correspondence with the tank supply pressure Pt and the regulator downstream pressure Pf that may be obtained from the A/D converter 61 and of initiating the fuel injection after the delay time Td has passed after the initiation of the power supply to the shut-off valve 41, in a case where it is determined that the gaseous fuel is designated as the fuel that is used in the engine 1 from the analysis result of the fuel designation signal that is input from the fuel-switching switch 4.

Figure 4:
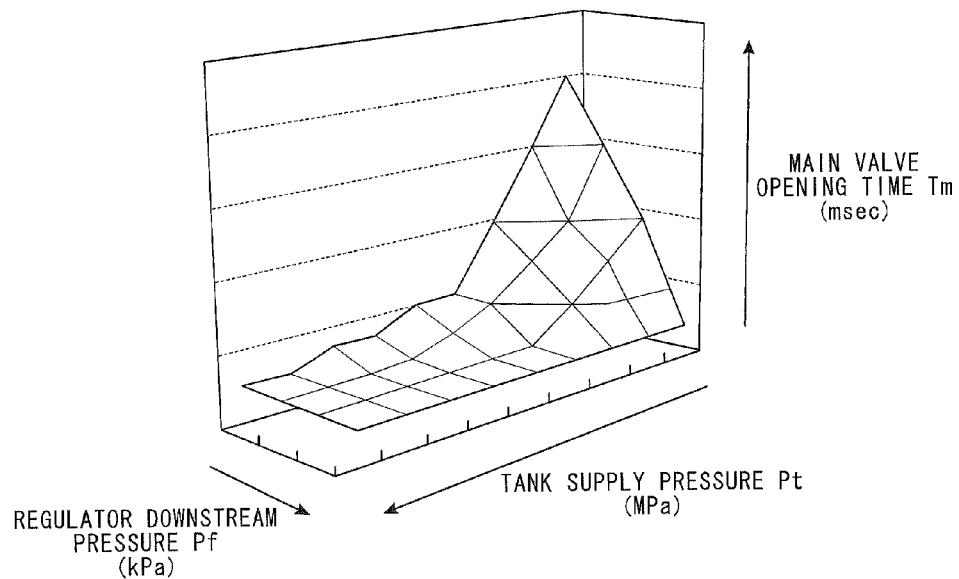
FIG. 4 is an example of a three-dimensional map illustrating a correspondence relationship between a regulator downstream pressure Pf, a tank supply pressure Pt, and a main valve opening time Tm, which are used to set a delay time Td.

In this embodiment, the CPU 67 acquires a main valve opening time Tm, which corresponds to the tank supply pressure Pt and the regulator downstream pressure Pf that may be obtained from the A/D converter 61, with reference to a three-dimensional map that is stored in advance in ROM 64 as shown in FIG. 4, and sets this acquired main valve opening time Tm as the delay time Td. In this way, the fuel injection is initiated after the delay time Td has passed after the initiation of the power supply to the shut-off valve 41, and thus occurrence of fuel supply shortage due to impossibility of valve opening of the main valve 104 may be avoided. Here, the main valve opening time Tm is a time taken until the main valve 104 is opened from the power supply to the shut-off valve 41. The main valve opening time Tm varies depending on upstream and downstream pressures (the tank supply pressure Pt and the regulator downstream pressure Pf) of the shut-off valve 41. When the variation tendency of the main valve opening time Tm is obtained in advance, an appropriate delay time may be set in correspondence with the tank supply pressure Pt and the regulator downstream pressure Pf that are actually detected. In this embodiment, the variation tendency of the main valve opening time Tm that depends on the tank supply pressure Pt of the shut-off valve 41 that is used and the regulator downstream pressure Pf is obtained in advance, a three-dimensional map representing this relationship is created, and this map is stored in the ROM 64.

Figure 5:
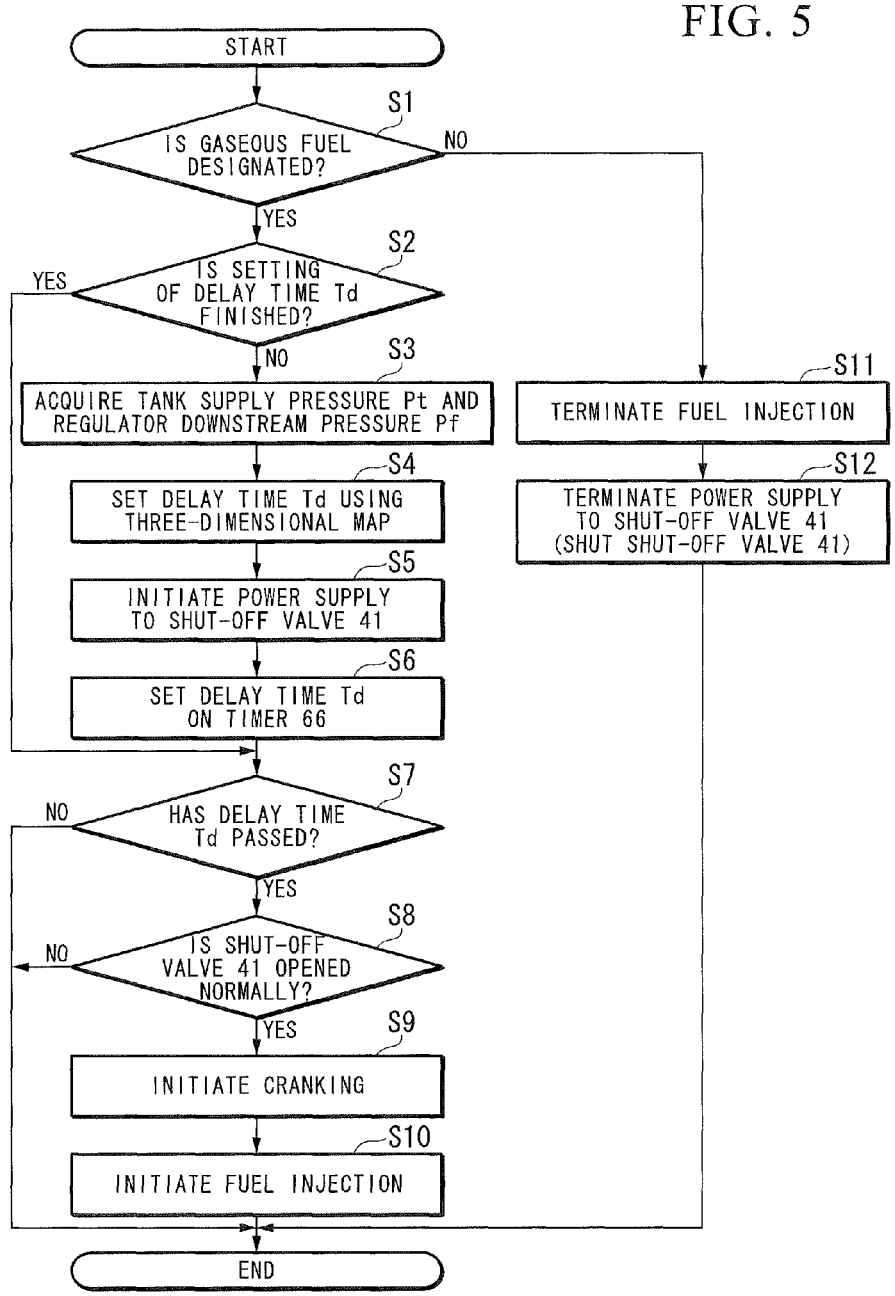
FIG. 5 is an operation flowchart of a CPU 67 according to the first embodiment.

FIG. 5 shows a flowchart illustrating a control process of the shut-off valve 41 and the gaseous fuel injection valve 23, which is executed by the CPU 67. As shown in FIG. 5, first, the CPU 67 analyzes a fuel designation signal input from the fuel-switching switch 4 and determines whether or not the gaseous fuel is designated as the fuel that the engine 1 uses (step S1). Here, in the case of "Yes", it proceeds to a process in step S2, and on the other hand, in the case of "No", it proceeds to a process in step S11.

In the case of "Yes" in step S1, the CPU 67 determines whether or not the setting of the delay time Td on the timer 66 is finished (step S2). Here, in the case of "Yes", it proceeds to a process in step S7, and on the other hand, in the case of "No", it proceeds to a process in step S3.

In the case of "No" in step S2, the CPU 67 acquires the tank supply pressure Pt and the regulator downstream pressure Pf from the A/D converter 61 (step S3). In addition, the CPU 67 acquires the main valve opening time Tm that corresponds to the tank supply pressure Pt and the regulator downstream pressure Pf with reference to the three-dimensional map that is stored in the ROM 64 and sets the main valve opening time Tm as the delay time Td (step S4). In addition, a value having a margin in the main valve opening time Tm may be set as the delay time Td.

In addition, the CPU 67 makes a request of generating a shut-off valve driving signal for the shut-off valve driving circuit 63 so as to initiate the power supply to the shut-off valve 41 (step S5). In addition, the CPU 67 performs a timer set of the delay time Td with respect to the timer 66 (step S6) simultaneously with the initiation of the power supply to the shut-off valve 41. Due to this, the timer 66 initiates time counting of the delay time Td.

In addition, in the case of "Yes" in step S2 or after the process in step S6 is terminated, the CPU 67 determines whether or not the delay time Td has passed based on the time counting result that is informed from the timer 66 (step S7). Here, in the case of "Yes", it proceeds to a process in step S8, and on the other hand, in the case of "No", the present control process is terminated.

In the case of "Yes" in step S7, the CPU 67 determines whether or not the shut-off valve 41 is normally opened (that is, both of the pilot valve 103 and the main valve 104 of the shut-off valve 41 are opened) (step S8). Here, in the case of "Yes", it proceeds to a process in step S9, and on the other hand, in the case of "No", the present control process is terminated.

It may be determined whether or not the shut-off valve 41 is normally opened by a method described below. A time-variable characteristic in the downstream pressure (the regulator downstream pressure Pf) of the shut-off valve 41 having the pilot valve 103 and the main valve 104 may have a different tendency in correspondence with open and shut states of the pilot valve 103 and the main valve 104 of the shut-off valve 41. Therefore, when a correspondence relationship between the time-variable characteristic of the regulator downstream pressure Pf and the open and shut states of the pilot valve 103 and the main valve 104 is obtained in advance, the open and shut states of the pilot valve 103 and the main valve 104 may be known from an actual measurement value of the regulator downstream pressure Pf based on the correspondence relationship.

In addition, the correspondence relationship between the time-variable characteristic of the regulator downstream pressure Pf and the open and shut states of the pilot valve 103 and the main valve 104 is different between a case in which the regulator downstream pressure Pf is less than or equal to a threshold value before the power supply to the shut-off valve 41 (a first case: a differential pressure between upstream and downstream of the shut-off valve 41 is large) and a case in which the regulator downstream pressure Pf exceeds the threshold value (a second case: the differential pressure between upstream and downstream of the shut-off valve 41 is small). Therefore, it is necessary to use a different correspondence relationship in each of the first case and the second case.

Figure 6:
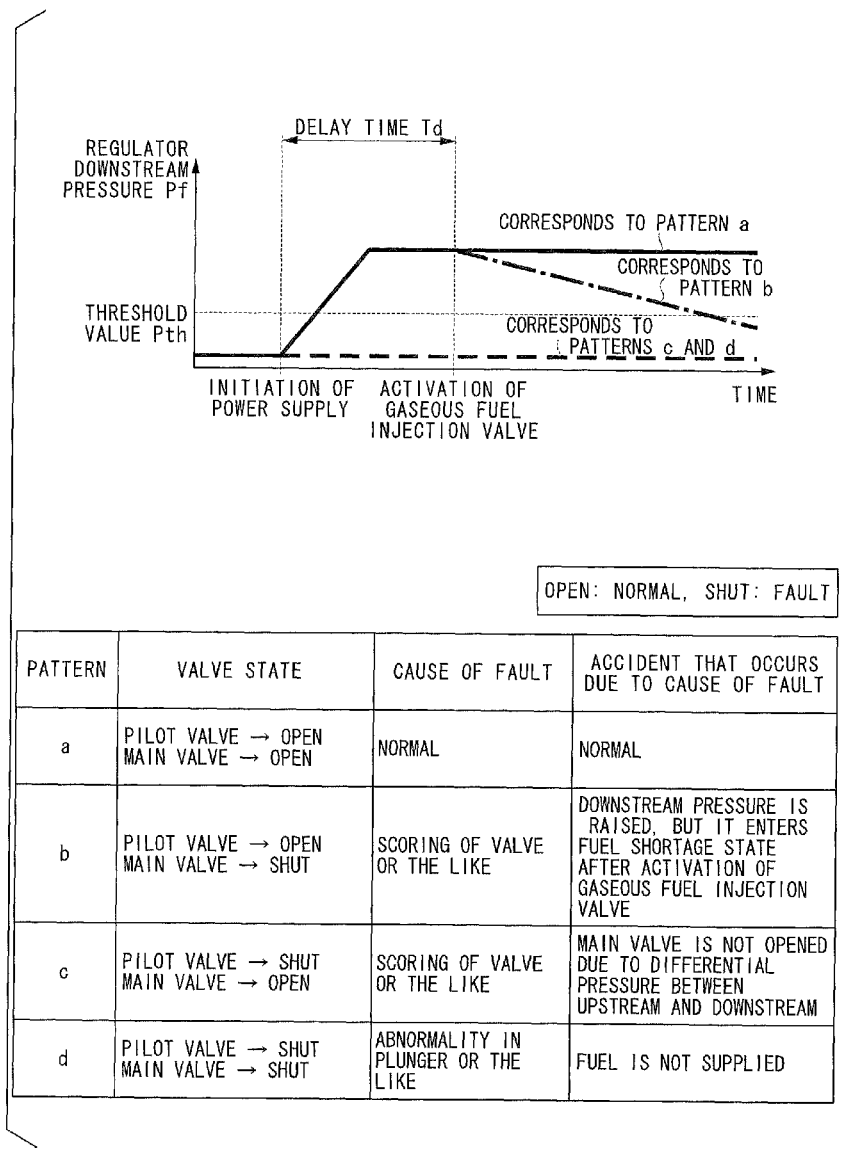
FIG. 6 is a first explanatory diagram relating to a method of determining whether or not a shut-off valve 41 is normally opened.

FIG. 6 illustrates the correspondence relationship between the time-variable characteristic of the regulator downstream pressure Pf and the open and shut states of the pilot valve 103 and the main valve 104 in the first case. FIG. 6(a) illustrates tendencies of the time-variable characteristic of the regulator downstream pressure Pf, and FIG. 6(b) illustrates the open and shut states of the pilot valve 103 and the main valve 104, which correspond to the tendencies.

As shown in FIG. 6(a), in regard to the first case, in a case where the regulator downstream pressure Pf does not exceed a threshold value Pth after the delay time Td has passed after the initiation of the power supply to the shut-off valve 41 (refer to a broken line portion), as shown in FIG. 6(b), it is estimated that both of the pilot valve 103 and the main valve 104 enter a shut valve state (refer to pattern d), or the pilot valve 103 enters a shut valve state and the main valve 104 enters an open valve state (refer to pattern c).

In addition, as shown in FIG. 6(a), in a case where the regulator downstream pressure Pf exceeds the threshold value Pth after the delay time Td has passed after the initiation of the power supply to the shut-off valve 41, it is estimated that at least the pilot valve 103 was normally opened. Therefore, consumption of fuel downstream of the shut-off valve 41 (downstream of the regulator 42) is attempted by activating the gaseous fuel injection valve 23. As shown in FIG. 6(a), in a case where the regulator downstream pressure Pf is equal to or lower than the threshold value Pth (refer to a one-dot chain line portion) after the activation of the gaseous fuel injection valve 23, since it is considered that fuel supply from upstream is not performed in a timely manner with respect to fuel consumption downstream of the regulator 42, as shown in FIG. 6(b), it is estimated that the main valve 104 is in a shut valve state (refer to pattern b).

Furthermore, after the activation of the gaseous fuel injection valve 23, as shown in FIG. 6(a), in a case where the regulator downstream pressure Pf is not equal to or lower than the threshold value Pth (refer to a solid line portion), since it is considered that fuel supply from upstream is performed in a timely manner with respect to fuel consumption downstream of the regulator 42, as shown in FIG. 6(b), it is estimated that the main valve 104 is also in an open valve state (refer to pattern a). That is, in this case, it may be determined that the shut-off valve 41 is normally opened.

Figure 7:
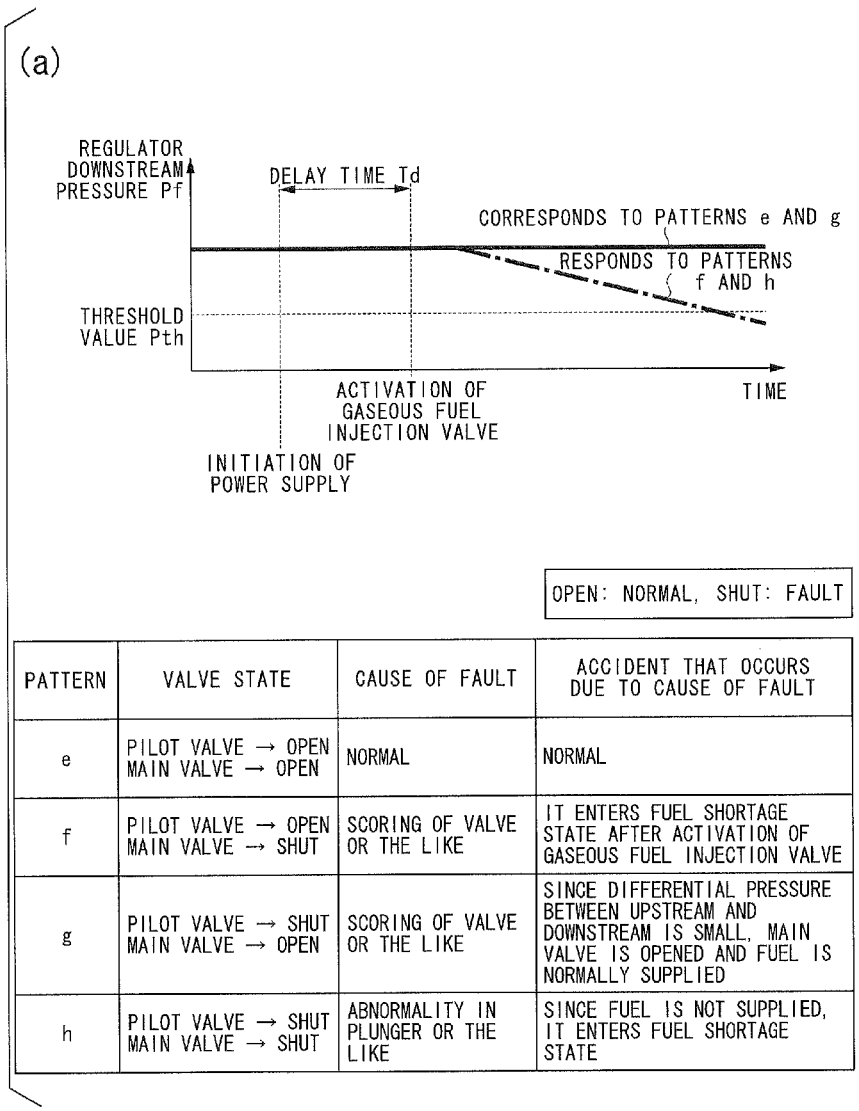
FIG. 7 is a second explanatory diagram relating to a method of determining whether or not the shut-off valve 41 is normally opened.

On the other hand, FIG. 7 illustrates the correspondence relationship between the time-variable characteristic of the regulator downstream pressure Pf and the open and shut states of the pilot valve 103 and the main valve 104 in the second case.

FIG. 7(a) illustrates tendencies of the time-variable characteristic of the downstream side pressure P, and FIG. 7(b) illustrates the open and shut states of the pilot valve 103 and the main valve 104, which correspond to the respective tendencies.

As shown in FIG. 7(a), in the second case, consumption of fuel downstream of the regulator 42 is attempted by activating the gaseous fuel injection valve 23 after the delay time Td has passed after the initiation of the power supply to the shut-off valve 41. After the activation of the gaseous fuel injection valve 23, as shown in FIG. 7(a), in a case where the regulator downstream pressure Pf is equal to or lower than the threshold value Pth (refer to an one-dot chain line portion), since it is considered that fuel supply from upstream is not performed in a timely manner with respect to fuel consumption downstream of the regulator 42, as shown in FIG. 7(b), it is estimated that at least the main valve 104 is in a shut valve state (refer to patterns f and h).

In addition, after the activation of the gaseous fuel injection valve 23, as shown in FIG. 7(a), in a case where the regulator downstream pressure Pf is not less than or equal to the threshold value Pth (refer to a solid line portion), since it is considered that fuel supply from upstream is performed in a timely manner with respect to fuel consumption downstream of the regulator 42, as shown in FIG. 7(b), it is estimated that at least the main valve 104 is in an open valve state (refer to patterns e and g). That is, in this case, it may be determined that the shut-off valve 41 is normally opened.

Returning to FIG. 5, in step S8, the CPU 67 determines whether or not the shut-off valve 41 is normally opened according to the above-described method. Here, in the case of "Yes", the CPU 67 initiates cranking (step S9), and makes a request of generating a fuel injection valve driving signal for the fuel injection valve driving circuit 62 so as to initiate the fuel injection by the gaseous fuel injection valve 23 (step S10).

On the other hand, in the case of "No" in step S1, that is, in a case where a liquid fuel is designated as the fuel that is used in the engine 1, the CPU 67 makes a request of terminating the generation of the fuel injection valve driving signal for the fuel injection valve driving circuit 62 as to terminate the fuel injection by the gaseous fuel injection valve 23 (step S11). Furthermore, the CPU 67 makes a request of terminating the generation of the shut-off valve driving signal for the shut-off valve driving circuit 63 so as to terminate the power supply to the shut-off valve 41 (shut the shut-off valve 41), and then the present control process is terminated (step S12). In addition, in a case where the liquid fuel is designated as the fuel that is used in the engine 1, the CPU 67 transmits an instruction of operation by the liquid fuel to the $1^{st}$-ECU 5 via the communication circuit 60 so as to switch the operation into an operation by the liquid fuel.

As described above, according to the first embodiment, the appropriate delay time Td may be set in correspondence with the tank supply pressure Pt and the regulator downstream pressure Pf that are actually detected. Therefore, the fuel injection initiation time after the power supply to the shut-off valve 41 may be appropriately controlled by delaying the fuel injection initiation time using the set delay time Td, and thus the occurrence of fuel supply shortage due to impossibility of valve opening of the main valve 104 may be avoided.

Second Embodiment

Figure 8:
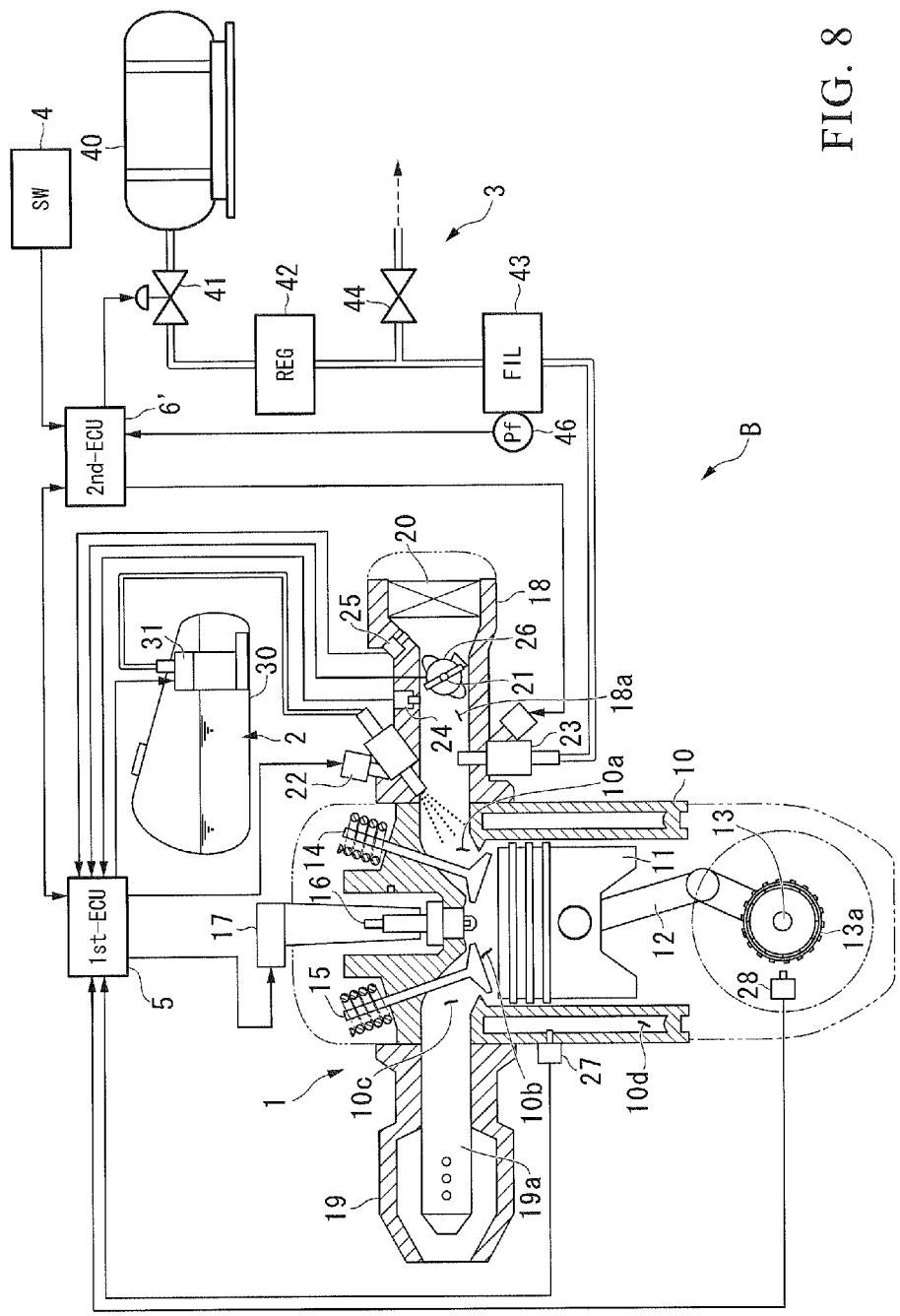
FIG. 8 is a schematic configuration diagram of a bi-fuel engine system B (a fuel supply system) according to a second embodiment.

Next, a bi-fuel engine system B according to a second embodiment will be described. FIG. 8 shows a schematic configuration diagram of the bi-fuel engine system B according to the second embodiment. In addition, in FIG. 8, the same reference numerals are given to the same constituent elements as FIG. 1 (the first embodiment).

Therefore, in the following description, for simplification of description, a description will be made with respect to only configurations of the bi-fuel engine system B in the second embodiment, which are different from the first embodiment, and a redundant description will be omitted.

As shown in FIG. 8, the second embodiment is different from the first embodiment in that in the bi-fuel engine system B, the first pressure sensor 45 is omitted and the regulator downstream pressure signal that is output from the second pressure sensor 46 is input to a $2^{nd}$-ECU 6'.

Figure 9:
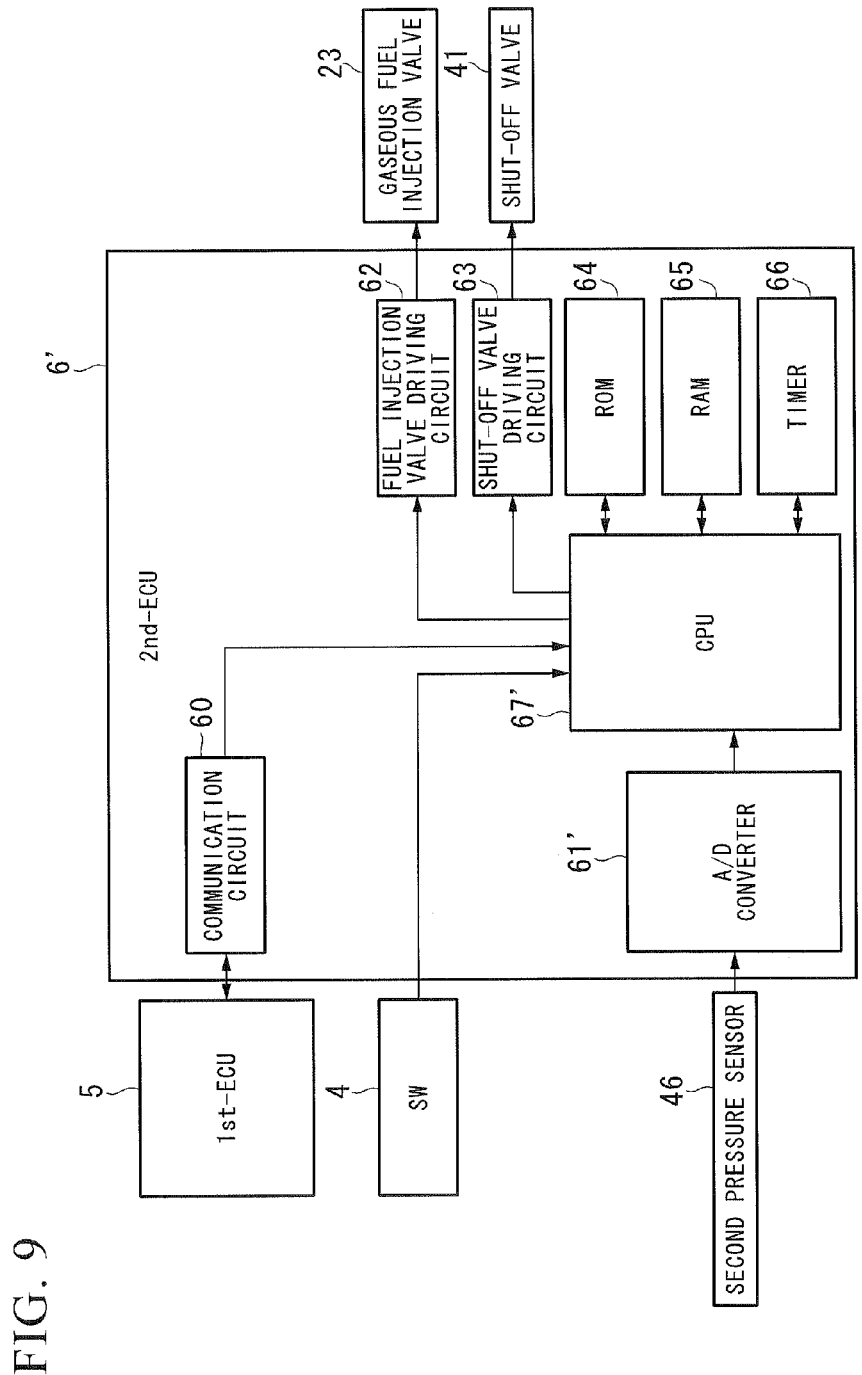
FIG. 9 is a block configuration diagram of a $2^{nd}$-ECU 6' (a fuel supply control device) according to the second embodiment.

FIG. 9 shows a block diagram illustrating an internal configuration of the $2^{nd}$-ECU 6'. As is clear from comparison between FIG. 9 and FIG. 3, the second embodiment is different from the first embodiment in that the $2^{nd}$-ECU 6' is equipped with an A/D converter 61' which converts the regulator downstream pressure signal that is input from the second pressure sensor 46 into a digital signal (the regulator downstream pressure Pf) and which outputs this digital signal to a CPU 67', and in that the $2^{nd}$-ECU 6' is equipped with the CPU 67' that has a function of initiating the fuel injection after passage of the delay time Td that is set in advance based on a specified pressure upstream of the regulator 42 and a specified pressure downstream of the regulator 42, in a case where the regulator downstream pressure Pf becomes greater than or equal to a predetermined pressure after the initiation of the power supply to the shut-off valve 41 (other functions of the CPU 67' are the same as the CPU 67 of the first embodiment).

Figure 10:
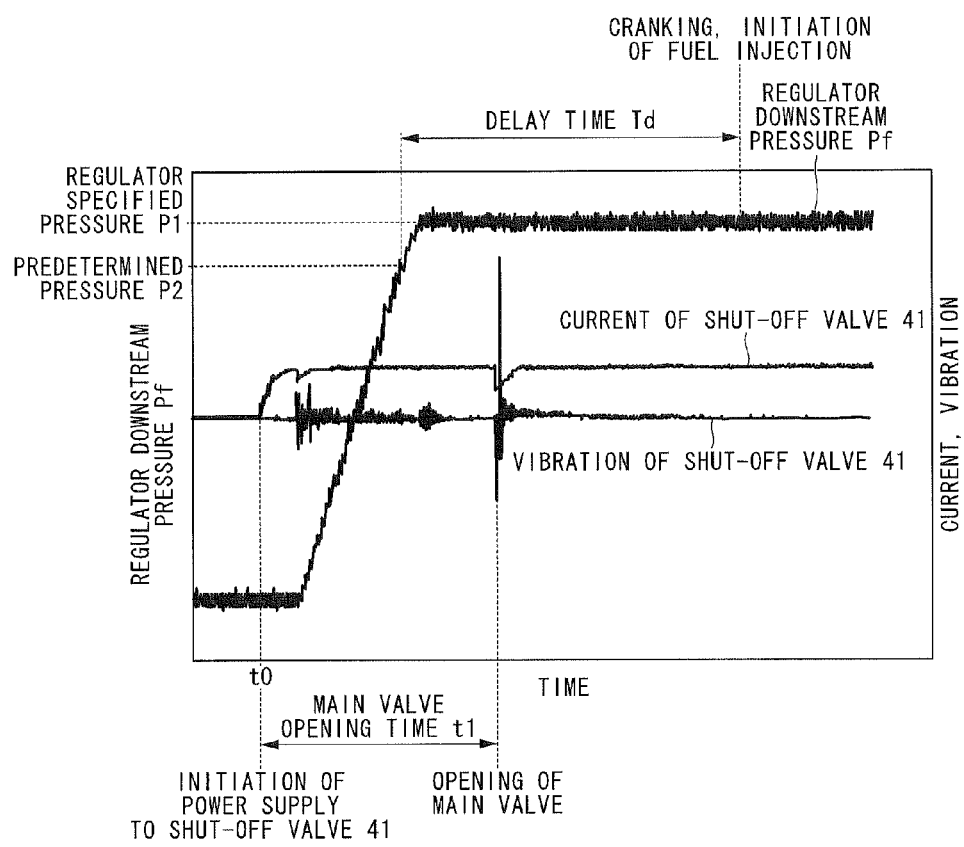
FIG. 10 is a diagram illustrating a variation characteristic in a downstream pressure of the shut-off valve 41 from the opening of a pilot valve 103 when the tank supply pressure Pt is a predetermined valve.

FIG. 10 illustrates a variation characteristic in the regulator downstream pressure Pf from the initiation of the power supply to the shut-off valve 41 in a case where the tank supply pressure Pt is in a predetermined valve. An operation of the second embodiment will be described with reference to FIG. 10. For example, the delay time Td is set by a tank supply assuring pressure and a regulator specified pressure P1. Here, the tank supply assuring pressure is an assurance pressure of the gaseous fuel that is supplied from the gaseous fuel tank 40, and the regulator specified pressure P1 is a set pressure downstream of the regulator 42. In a case where the pressures upstream and downstream of the regulator 42 are known based on these pressures, when the regulator downstream pressure Pf that is actually detected is greater than or equal to a predetermined pressure P2, a valve opening time t1 of the main valve 104 is uniquely determined. The valve opening time t1 of the main valve 104, which is uniquely determined, is set as the delay time Td in advance. In addition, the delay time Td may be set in such a manner that the valve opening time t1 is made to have a margin. After the initiation time t0 of the power supply to the shut-off valve 41, the pilot valve 103 is opened and thus the regulator downstream pressure Pf increases. When the gaseous fuel injection valve 23 is activated after the delay time Td has passed after a time at which the regulator downstream pressure Pf reaches a predetermined valve (a predetermined pressure P2 in FIG. 10), it does not cause a situation of the fuel supply shortage due to the impossibility of valve opening of the main valve 104.

Figure 11:
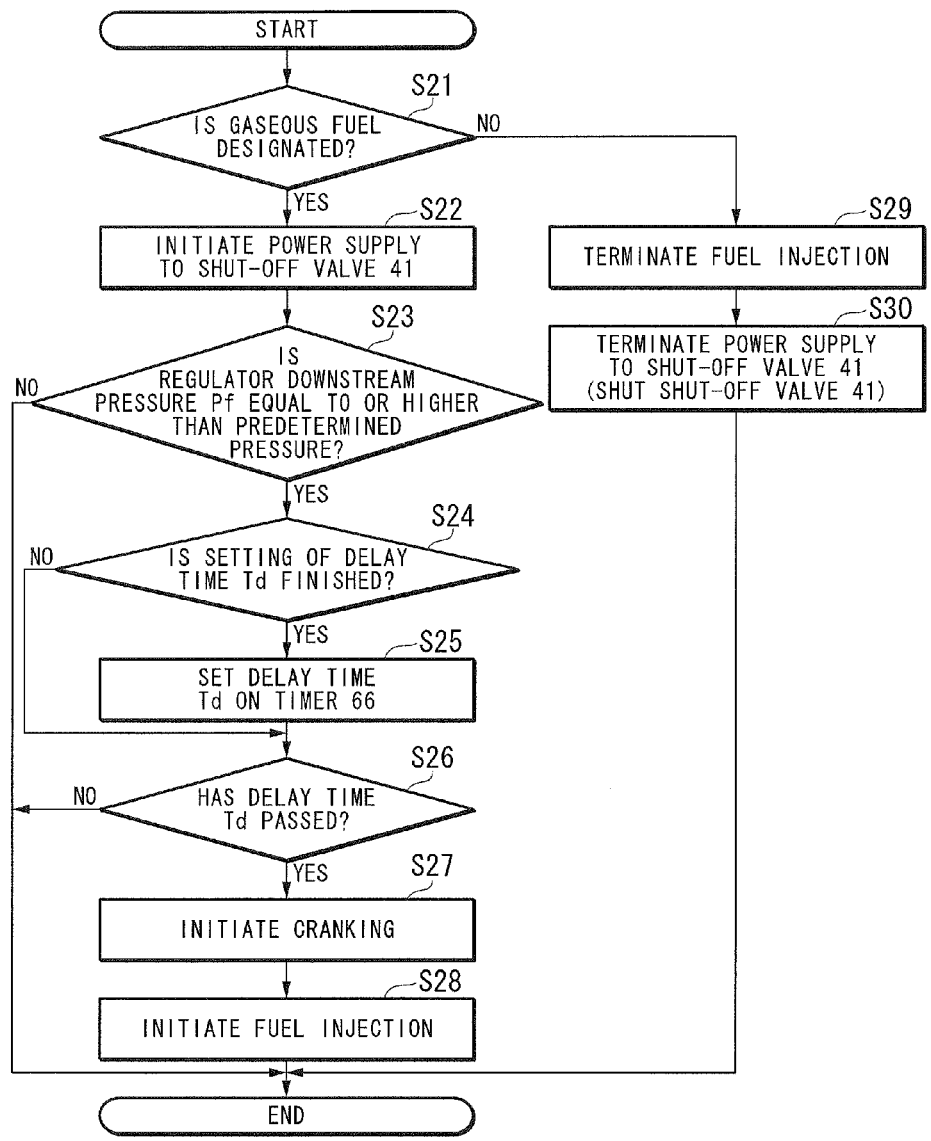
FIG. 11 is an operation flowchart of a CPU 67' according to the second embodiment.

FIG. 11 shows a flowchart illustrating a control process of the shut-off valve 41 and the gaseous fuel injection valve 23 that the CPU 67' executes. As shown in FIG. 11, first, the CPU 67' analyzes a fuel designation signal input from the fuel-switching switch 4 and determines whether or not the gaseous fuel is designated as the fuel that the engine 1 uses (step S21).

Here, in the case of "Yes", it proceeds to a process in step S22, and on the other hand, in the case of "No", it proceeds to a process in step S29.

In the case of "Yes" in step S21, the CPU 67' makes a request of generating a shut-off valve driving signal for the shut-off valve driving circuit 63 so as to initiate the power supply to the shut-off valve 41 (step S22). In addition, the CPU 67' determines whether or not the regulator downstream pressure Pf is greater than or equal to a predetermined pressure (step S23). Here, in the case of "Yes", it proceeds to a process in step S24, and on the other hand, in the case of "No", the present control process is terminated.

In the case of "Yes" in step S23, the CPU 67' determines whether or not setting of the delay time Td on the timer 66 is finished (step S24). Here, in the case of "Yes", it proceeds to a process in step S26, and on the other hand, in the case of "No", the CPU 67' performs a timer set of the delay time Td with respect to the timer 66 (step S25). Due to this, the timer 66 initiates time counting of the delay time Td.

In addition, in the case of "Yes" in step S24 or after the process in step S25 is terminated, the CPU 67' determines whether or not the delay time Td has passed based on the time counting result that is informed from the timer 66 (step S26). Here, in the case of "Yes", it proceeds to a process in step S27, and on the other hand, in the case of "No", the present control process is terminated. In the case of "Yes" in step S26, the CPU 67' initiates cranking (step S27). Furthermore, the CPU 67' makes a request of generating the fuel injection valve driving signal for the fuel injection valve driving circuit 62 so as to initiate the fuel injection by the gaseous fuel injection valve 23 (step S28).

On the other hand, in the case of "No" in step S21, that is, in a case where the liquid fuel is designated as the fuel that is used in the engine 1, the CPU 67' makes a request of terminating the generation of the fuel injection valve driving signal for the fuel injection valve driving circuit 62 so as to terminate the fuel injection by the gaseous fuel injection valve 23 (step S29). Furthermore, the CPU 67' makes a request of terminating the generation of the shut-off valve driving signal for the shut-off valve driving circuit 63 so as to terminate the power supply to the shut-off valve 41 (shut the shut-off valve 41), and then the present control process is terminated (step S30). In addition, in a case where the liquid fuel is designated as the fuel that is used in the engine 1, the CPU 67' transmits an instruction of operation by the liquid fuel to the $1^{st}$-ECU 5 via the communication circuit 60 so as to switch the operation into an operation by the liquid fuel.

As described above, according to the second embodiment, the main valve opening time Tm that is uniquely determined by the specified pressure upstream of the regulator 42 and the specified pressure downstream of the regulator 42 is set in advance as the delay time Td (at this time, the delay time Td may be set to have a margin or not to have a margin), and the fuel injection is initiated after the delay time Td that is set in advance has passed after the initiation of the power supply to the shut-off valve 41. Therefore, the initiation time of the fuel injection after the power supply to the shut-off valve 41 may be appropriately controlled. As a result, the fuel supply shortage due to the impossibility of valve opening of the main valve 104 may be avoided. In addition, in the second embodiment, it is sufficient for the number of pressure sensors (the second pressure sensor 46) to be one, and thus the cost reduction is also possible.

In addition, the present invention is not limited to the first embodiment and the second embodiment, and the following modification examples may be made.

(1) In the first embodiment, a description was made with respect to a case in which the delay time Td is set in correspondence with the tank supply pressure Pt and the regulator downstream pressure Pf as an example. However, in addition to the tank supply pressure Pt and the regulator downstream pressure Pf, the delay time Td may be set in correspondence with, for example, a battery voltage.

Specifically, the three-dimensional map shown in FIG. 4 may be prepared for each of a plurality of battery voltages that are different from each other, a battery voltage detection circuit may be provided in the $2^{nd}$-ECU 6, and the CPU 67 may be provided with a function of switching the three-dimensional map that is referred to in correspondence with a battery voltage that is detected by the detection circuit. Furthermore, in addition to the battery voltage, a fuel temperature or an intake air temperature may be used as a parameter. That is, in addition to the tank supply pressure Pt and the regulator downstream pressure Pf, the delay time Td may be set based on at least one of the battery voltage, the fuel temperature, and the intake air temperature. Due to this, the delay time Td may be set with high accuracy in accordance with an operation situation of the engine 1, and thus the occurrence of the fuel supply shortage may be reliably avoided.

(2) In the second embodiment, a description was made with respect to a case in which the delay time Td that is set in advance based on the specified pressure upstream of the regulator 42 and the specified pressure downstream of the regulator 42 is used as an example. However, in addition to the specified pressure upstream of the regulator 42 and the specified pressure downstream of the regulator 42, the delay time Td may be set in advance based on, for example, the battery voltage.

Specifically, for each of a plurality of battery voltages that are different from each other, the delay time Td may be set in advance based on the specified pressure upstream of the regulator 42 and the specified pressure downstream of the regulator 42, the battery voltage detection circuit may be provided in the $2^{nd}$-ECU 6, and the CUP 67' may be provided with a function of switching the delay time Td that is used in correspondence with a battery voltage that is detected by the detection circuit. Furthermore, in addition to the battery voltage, a fuel temperature or an intake air temperature may be used as a parameter. That is, in addition to the specified pressure upstream of the regulator 42 and the specified pressure downstream of the regulator 42, the delay time Td may be set in advance based on at least one of the battery voltage, the fuel temperature, and the intake air temperature. Due to this, the initiation time of the fuel injection may be controlled by using the delay time Td with high accuracy in accordance with an operation situation of the engine 1, and thus the occurrence of the fuel supply shortage may be reliably avoided.

(3) In the first and second embodiments, the bi-fuel engine systems A and B which include the $1^{st}$-ECU 5 that carries out an operation control through the liquid fuel and the $2^{nd}$-ECUs 6 and 6' that carry out an operation control through the gaseous fuel and fault diagnosis of the shut-off valve 41, separately, were given as examples, but a configuration in which the functions of the two ECUs are integrated in one ECU may be adopted.

(4) In the first and second embodiments, as an example, a description was made with respect to the bi-fuel engine systems A and B as the fuel supply system relating to the present invention, but the present invention is not limited thereto, and the present invention is applicable to a mono fuel engine system that supplies only the gaseous fuel to a single engine.

Figure 12:
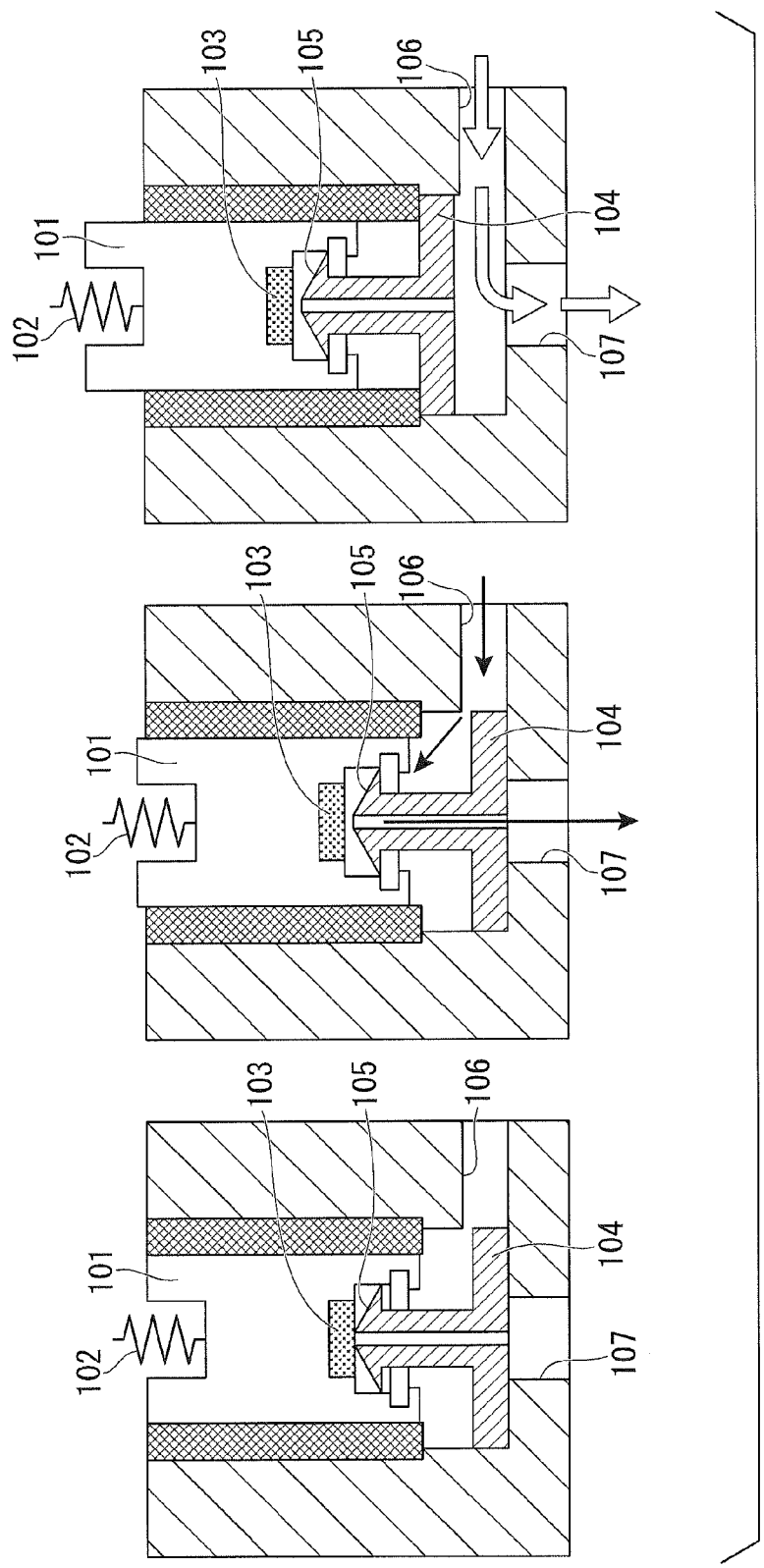
FIG. 12 is an internal configuration example of a shut-off valve having a kick pilot structure.

(5) The kick pilot structure of the shut-off valve 41 shown in FIG. 12 is illustrative only, and the present invention is applicable to a shut-off valve as long as the shut-off valve includes a first valve body that is opened in advance during power supply and a second valve body that is opened due to a decrease in the differential pressure between upstream and downstream after the first valve body is opened.

INDUSTRIAL APPLICABILITY

According to the fuel supply control device and the fuel supply system according to the present invention, it is possible to provide a fuel supply system and a fuel supply control device, which are capable of avoiding occurrence of fuel supply shortage by appropriately controlling an initiation time of fuel injection after the power supply to the shut-off valve in the case of using the shut-off valve having a kick pilot structure.

The invention claimed is:

1. A fuel supply control device that performs power supply control of a shut-off valve including a first valve body that is disposed at a fuel supply path ranging from a gaseous fuel tank to a regulator and is opened in advance during power supply, and a second valve body that is opened due to a decrease in a differential pressure between upstream and downstream after the first valve body is opened, and fuel injection control, the fuel supply control device comprising:
a control unit that sets a delay time from an initiation time of power supply to the shut-off valve to an initiation time of fuel injection in correspondence with a first fuel pressure upstream of the shut-off valve and a second fuel pressure downstream of the regulator, and initiates fuel injection after the delay time has passed after the initiation of the power supply to the shut-off valve.

2. The fuel supply control device according to claim 1, wherein the control unit sets the delay time in correspondence with at least one of a battery voltage, a fuel temperature, and an intake air temperature, in addition to the first fuel pressure and the second fuel pressure.

3. A fuel supply control device that performs power supply control of a shut-off valve including a first valve body that is disposed at a fuel supply path ranging from a gaseous fuel tank to a regulator and is opened in advance during power supply, and a second valve body that is opened due to a decrease in a differential pressure between upstream and downstream after the first valve body is opened, and fuel injection control, the fuel supply control device comprising:
a control unit that initiates fuel injection after passage of a delay time that is set in advance based on a specified pressure upstream of the regulator and a specified pressure downstream of the regulator, in a case where a fuel pressure downstream of the regulator is greater than or equal to a predetermined pressure after the initiation of the power supply to the shut-off valve.

4. The fuel supply control device according to claim 3, wherein the delay time is set in advance based on at least one of a battery voltage, a fuel temperature, and an intake air temperature, in addition to the specified pressure upstream of the regulator and the specified pressure downstream of the regulator.

5. A fuel supply system that is provided with a shut-off valve including a first valve body that is disposed at a fuel supply path ranging from a gaseous fuel tank to a regulator and is opened in advance during power supply, and a second valve body that is opened due to a decrease in a differential pressure between upstream and downstream after the first valve body is opened, the fuel supply system comprising:
a first pressure sensor that detects a fuel pressure upstream of the shut-off valve as a first fuel pressure;
a second pressure sensor that detects a fuel pressure downstream of the regulator as a second fuel pressure; and
a fuel supply control device that sets a delay time from an initiation time of power supply to the shut-off valve to an initiation time of fuel injection in correspondence with the first fuel pressure and the second fuel pressure, and initiates fuel injection after the delay time has passed after the initiation of the power supply to the shut-off valve.

6. The fuel supply system according to claim 5, wherein the fuel supply control device sets the delay time in correspondence with at least one of a battery voltage, a fuel temperature, and an intake air temperature, in addition to the first fuel pressure and the second fuel pressure.

7. A fuel supply system that is provided with a shut-off valve including a first valve body that is disposed at a fuel supply path ranging from a gaseous fuel tank to a regulator and is opened in advance during power supply, and a second valve body that is opened due to a decrease in a differential pressure between upstream and downstream after the first valve body is opened, the fuel supply system comprising:
a pressure sensor that detects a fuel pressure downstream of the regulator; and
a fuel supply control device that initiates fuel injection after passage of a delay time that is set in advance based on a specified pressure upstream of the regulator and a specified pressure downstream of the regulator, in a case where the fuel pressure is equal to or higher than a predetermined pressure after the initiation of the power supply to the shut-off valve.

8. The fuel supply system according to claim 7, wherein the delay time is set in advance based on at least one of a battery voltage, a fuel temperature, and an intake air temperature, in addition to the specified pressure upstream of the regulator and the specified pressure downstream of the regulator.

* * * * *